Figure 1:
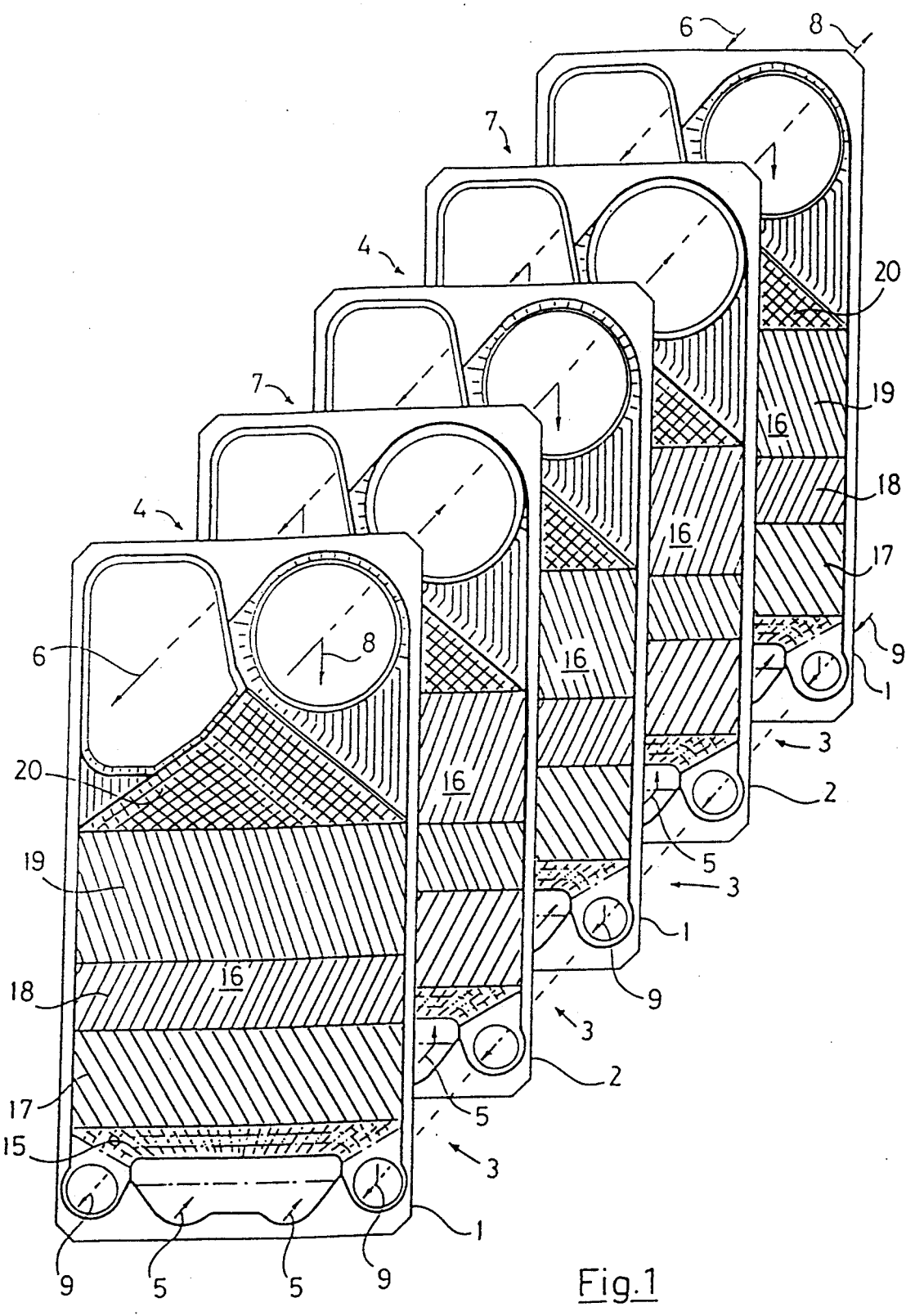

United States Patent

Hallgren

[11] Patent Number: 5,174,370
[45] Date of Patent: Dec. 29, 1992

[54] PLATE EVAPORATOR
[75] Inventor: Leif Hallgren, Lund, Sweden
[73] Assignee: Alfa-Laval Thermal AB, Lund, Sweden
[21] Appl. No.: 761,737
[22] PCT Filed: Apr. 15, 1991
[86] PCT No.: PCT/SE91/00267
  § 371 Date: Sep. 16, 1991
  § 102(e) Date: Sep. 16, 1991
[87] PCT Pub. No.: WO91/16589
  PCT Pub. Date: Oct. 31, 1991
[30] Foreign Application Priority Data
  Apr. 17, 1990 [SE] Sweden ............................ 9001353
[51] Int. Cl.⁵ .................................................. F28F 3/02
[52] U.S. Cl. .................................... 165/166; 165/167; 165/147
[58] Field of Search ................. 165/146, 147, 166, 167
[56] References Cited

U.S. PATENT DOCUMENTS

| | | | |
|---|---|---|---|
| 3,399,708 | 9/1968 | Usher et al. | 165/167 X |
| 3,862,661 | 1/1975 | Kovalenko et al. | 165/166 |
| 4,376,460 | 3/1983 | Skoog | 165/167 |
| 4,586,565 | 5/1986 | Hallström et al. | 165/167 |
| 4,630,674 | 12/1986 | Skoog | 165/147 |
| 4,678,030 | 7/1987 | Almqvist | 165/166 |

FOREIGN PATENT DOCUMENTS 2109346 10/1971 Fed. Rep. of Germany ...... 165/167

*Primary Examiner*—Allen J. Flanigan
*Attorney, Agent, or Firm*—Davis, Hoxie, Faithfull & Hapgood

[57] ABSTRACT

The present invention relates to a plate heat exchanger for the evaporation of a fluid which is comprised of a plurality of heat transfer plate pairs. Each plate of the pair has a ridged and grooved corrugation pattern. Between adjacent plates are flow spaces, each having an inlet and an outlet. The ridges of each plate of each pair abut the ridges of the other plate in the pair to form a plurality of supporting points. The flow spaces between alternate plates form passages for the fluid, and the remaining flow spaces form passages for a heating fluid.

The importance of the invention is that at least alternate heat transfer plates have a plurality of zones with different corrugation patterns arranged sequentially in the direction of fluid flow in the passages. The ridges and grooves of each plate in the pair are arranged to provide a flow resistance which gradually decreases in the direction of fluid and generated vapor flow.

10 Claims, 3 Drawing Sheets

PLATE EVAPORATOR

The present invention relates to a plate heat exchanger, for the evaporation of a fluid, which comprises a plurality of heat transfer plate pairs. Each plate of the pair has a ridged and grooved corrugation pattern. Between adjacent plates are flow spaces, each having an inlet and an outlet. The ridges of each plate of each pair abut the ridges of the other plate in the pair D to form a plurality of supporting points. The flow spaces between alternate plates form passages for the fluid, and the remaining flow spaces form passages for a heating fluid.

In a known heat exchanger of this kind as described in DE-A1 3721132, the main part of the heat transfer portion of each entire surface. However, this design has proved to be ineffective in improving the heat transfer capacity of the plate heat exchanger.

An object of the present invention is to increase the efficiency of plate heat exchangers of the type described. This is accomplished by arranging the plurality of plate pairs so that at least alternate plates have a plurality of zones with different corrugation patterns, arranged sequentially in the direction of fluid flow, to provide flow resistance which gradually decreases in the direction of fluid and generated vapour flow.

When a fluid flows through the evaporation passage and gradually evaporates, a greater amount of volume is required for the produced vapour. However, it is difficult to provide for such increased volume in the plate interspace. Therefore, the exchanger must effectively accommodate a gradually increasing flow rate of the produced vapour.

Although the above-mentioned corrugation patterns of the heat transfer plates are intended to improve the efficiency of the plate heat exchanger, the patterns also cause a considerable flow resistance to the produced vapour. As a result, a significant pressure drop in the rapidly flowing vapour is created. Therefore, the absolute pressure in the section of the passage in which evaporation is to begin must be maintained rather high, i.e., the boiling point of the fluid must be maintained rather high.

One object of this invention is to keep the boiling point of the fluid as low as possible so that the heating fluid may be maintained at the lowest temperature possible. Simultaneously, another object is to employ heat transfer plates having corrugation patterns which maximize the efficiency of the heat exchanger.

In a plate heat exchanger according to the invention, a gradually decreasing flow resistance in the flow direction is obtained in the evaporating passages for the fluid and generated vapour. A very efficient heat transfer to the fluid is thereby achieved in the inlet portion of the flow spaces despite the relatively low flow rate of the fluid. At the same time, an excessive flow resistance for the produced vapour, i.e., excessive pressure drop of said vapour, is avoided in the outlet of the flow spaces. In practice this leads to the result that if a certain, previously-used, plate size is maintained, it is possible to reduce the total heat transfer surface and, thus, the number of plates in a plate heat exchanger, for solving a certain evaporating task. In other words, the invention, which applies to both falling film and climbing film evaporators, enables the design of a plate heat exchanger which provides optimal heat transfer at a given saturation pressure for the generated vapour.

It has been previously known in the art that the heat transfer between two heat transfer plates and a heat transfer fluid flowing through a passage between the two plates is influenced by the position of the ridges of a plate with respect to both the position of the ridges of the other plate in the pair as well as the direction of fluid flow. If the ridges of each plate in an abutting plate pair intersect at an obtuse angle relative to the flow direction of the fluid, both a greater fluid pressure drop as well as a more efficient heat transfer would be obtained than if the ridges intersected at an acute angle. In accordance with the invention, the design of the corrugation pattern of the heat transfer plates can be varied so that the ridges of each plate in a pair of heat transfer plates provide a varying flow resistance in different sections of the flow passages.

In a plate heat exchanger arranged for climbing film evaporation, i.e., in which the heat transfer plates are arranged vertically and the fluid to be evaporated is supplied to the lower portion of alternate flow spaces, the height of the heat transfer plates, which is dependent upon the static pressure of the fluid in the plate interspace, crucially affects the saturation pressure of the produced steam. By applying the principles of the present invention, maximum heat transfer can be effected through use of heat transfer plates at their optimum height.

Figure 2:
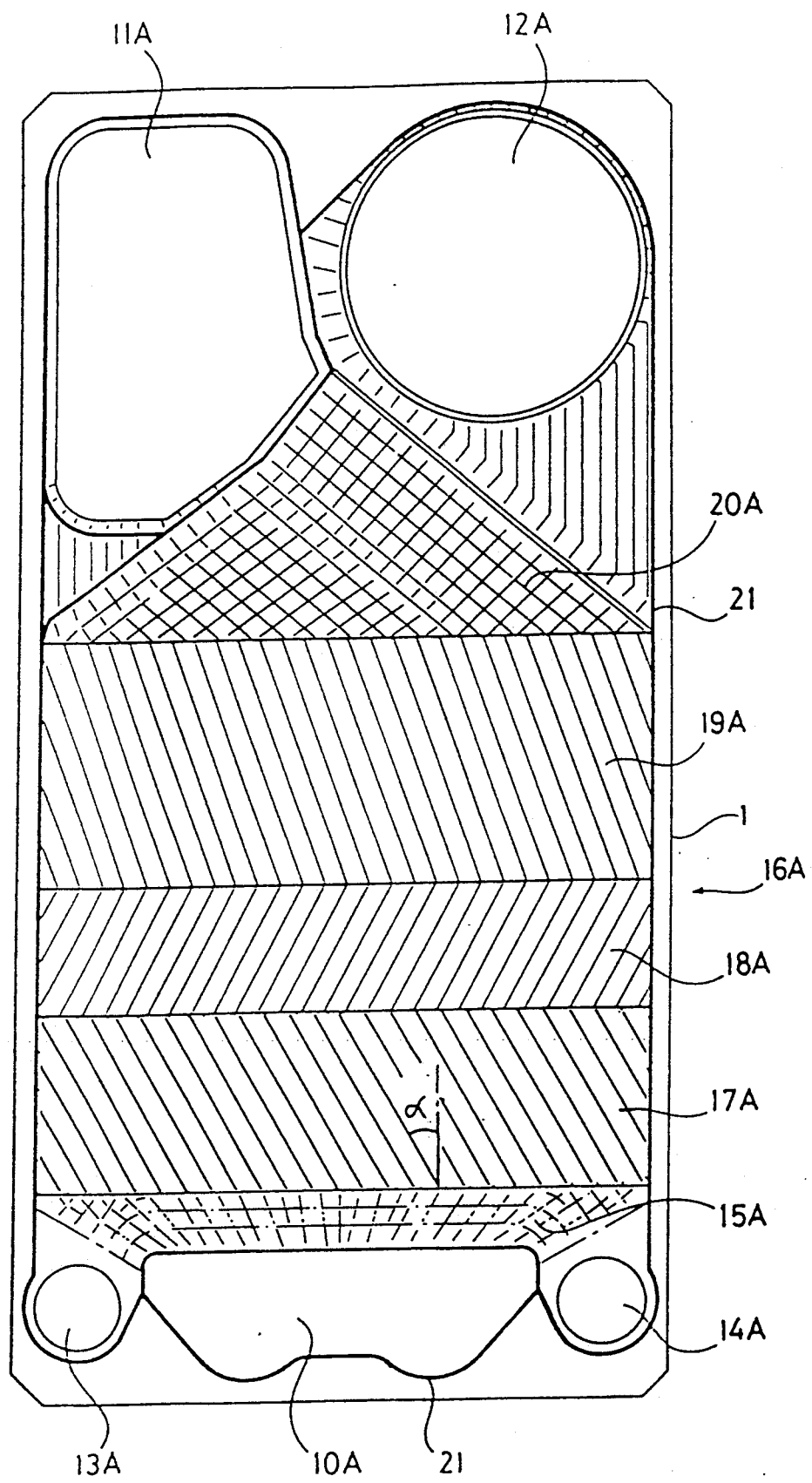
Figure 3:
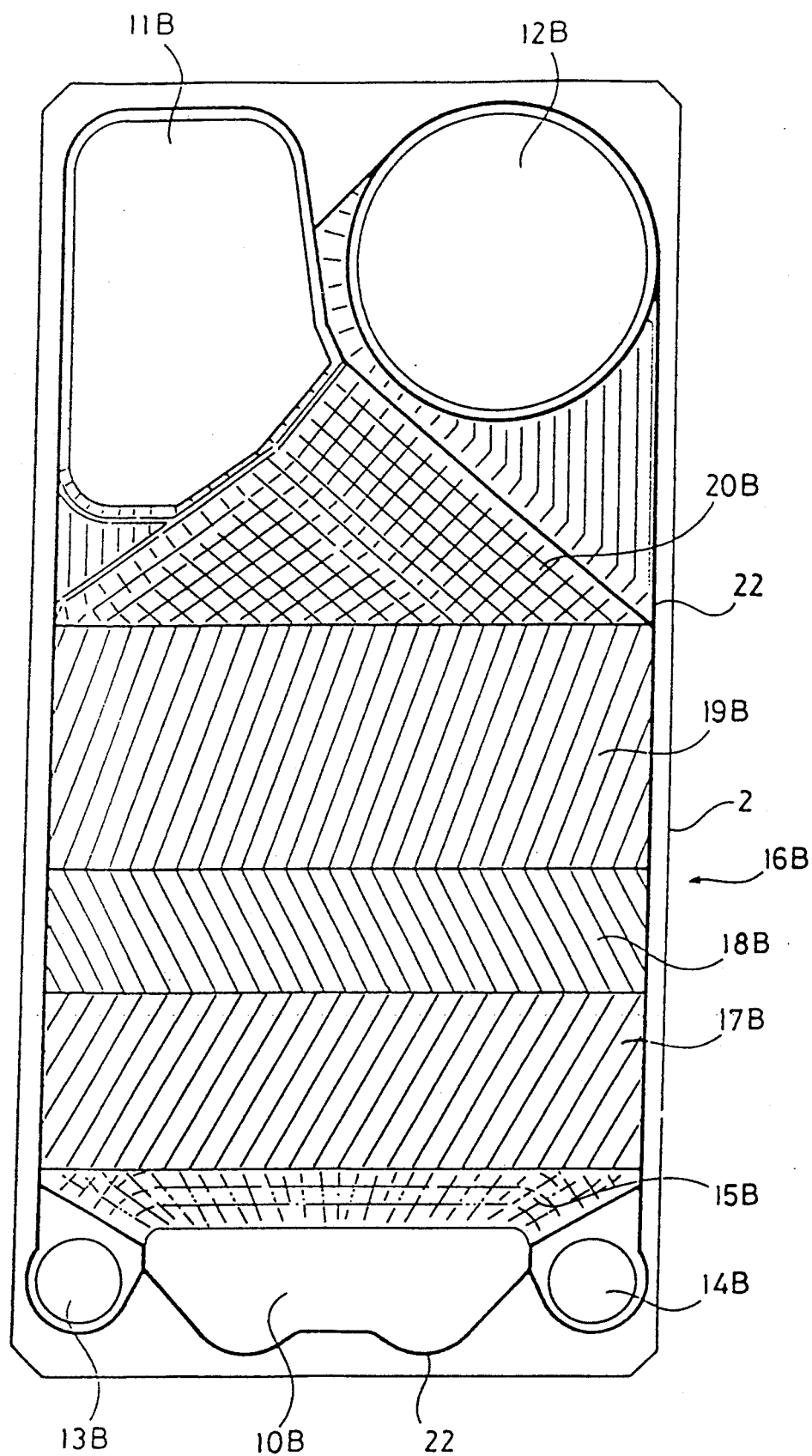

The invention will be further described with reference to the accompanying drawings, in which:

FIG. 1 is an exploded schematic view of a plate heat exchanger formed in accordance with the invention having two types of heat transfer plates, FIG. 2 is a schematic front view of one type of heat transfer plate, and FIG. 3 is a schematically-shown front view of a second type of heat transfer plate.

The plate heat exchanger shown in FIG. 1 comprises two types of heat transfer plates 1 and 2, each having a different corrugation pattern. The plates are intended to be kept together in a frame (not shown) in a conventional manner. As is wellknown in the art, the heat transfer plates 1 and 2 may have rubber gaskets along their edges to delimit the flow spaces 3 there between. As an alternative, the plates could be permanently joined to each other, e.g. through soldering, welding or glueing.

Corrugation patterns in the shape of ridges and grooves are pressed into the heat transfer plates 1 and 2. The abutting ridges of two adjacent plates intersect to form a plurality of supporting points in the flow spaces 3 between the plates. Located in the flow spaces 3 between alternate plates are passages 4 for evaporating a fluid. The passages 4 communicate with a fluid inlet 5 which extends through the lower portion of the assembly of heat transfer plates and an outlet 6 for the fluid and generated vapour. The outlet 6 extends through an upper portion of the heat transfer plate assembly. The remaining flow spaces in the assembly form the passages 7 for a heating fluid, such as steam. The passages 7 communicate with a steam inlet 8 that extends through the upper portion of the heat transfer plates and two condensate outlets 9 which extend through the lower portion of the heat transfer plate assembly.

The heat exchanger shown in FIG. 1 is principally used for evaporation or concentration of various liquid products by means of climbing film evaporation. The heat transfer plates 1 and 2 are arranged vertically, and fluid to be evaporated is supplied to the lower portion of the flow spaces 4 and discharged at their upper portion. For counterflow heat exchanging the plate heat exchanger is arranged for falling film evaporation. The heating medium, e.g., steam, is supplied at the upper portion of the passages 7, and the condensate produced is discharged at the lower portion of the passages 7.

Each of the heat transfer plates 1 and 2 has a lower distribution area 15, an upper distribution area 20, and a heat transferring portion 16, which is divided into discrete zones 17, 18 and 19 having a different corrugation patterns. The lower distribution area 15 conveys the fluid in each passage 4 in an essentially vertical direction upwardly from the inlet 5 to the heat transfer portion 16. In each passage 7, the lower distribution area 15 conveys the condensate both vertically downwards and horizontally towards the outlets 9 on each side of the plate. The upper distribution area is formed in a manner which is more precisely described in U.S. Pat. No. 3,783,090.

The heat transfer plates 1 and 2 as shown in FIGS. 2 and 3 have an elongated rectangular shape and punched holes located at both their top and bottom portions. These holes form: (1) ports 10A and 10B, respectively, at the bottom portion of the plates for the fluid to be evaporated; (2) ports 11A and 11B, respectively, at the top portion of the plates for concentrated fluid and generated vapour; (3) ports 12A and 12B, respectively, at the top portion of the plates for heating steam; and (4) two ports, 13A, 14A and 13B, 14B, respectively, at the bottom portion of the plates for the condensate and uncondensed heating medium, e.g., steam.

As shown in FIGS. 2 and 3, the heat transfer plates 1 and 2 have lower distribution areas 15A and 15B, respectively, upper distribution areas 20A and 20B, respectively, and heat transfer portion 16A and 16B, respectively, which are further divided into distinct zones 17A, 18A, 19A, and 17B, 18B, and 19B, respectively, having different corrugation patterns.

On one of the sides of the heat transfer plate 1 shown in FIG. 2 are a plurality of grooves which house a one-piece gasket 21. The gasket extends around each of the ports 10A and 10B and around the plate periphery. Similarly, the heat exchange plate 2 shown in FIG. 3 has a plurality of grooves housing a gasket 22 which extends around each of the ports 12B, 13B, and 14B as well as around the plate periphery. The gaskets 21 and 22 form a seal between adjacent heat transfer plates 1 and 2. Alternatively, the gasket grooves of two adjacent plates can be welded together, with the bottom of the grooves turned against each other. In such an embodiment, only alternate plate interspaces are provided with gaskets, which in such case occupies two grooves facing each other in adjacent heat transfer plates.

In the corrugation zones 17A-19A and 17B-19B respectively, the ridges and grooves incline at different angles relative to the intended main flow direction of the fluid and, in general, the longitudinal axis of the plate. Accordingly, the angle of the ridges and grooves decreases from the lower distribution areas 15A and 15B, respectively, to the upper distribution areas 20A and 20B, respectively.

In the embodiment of the invention as shown in FIG. 2, the angle α between the direction of the main fluid flow and the extension of the corrugating ridges of the plate 1 is about 30° in zone 17A, 25° in zone 18A, and 20° in zone 19A. In plate 2 as shown in FIG. 3 the ridges of the zones 17B-19B form angles of the same magnitude with the main flow direction; however, they extend in a different direction than do the ridges of zones 17A-19A of plate 1. Thus, the ridges of plate 1 will abut and intersect the ridges of adjacent plate 2. The value given on the angle α has been chosen with reference to a certain heat exchange duty for the present heat exchanger. Other values can of course be chosen for other heat exchange applications.

Fluid which is to be completely or partially evaporated is supplied to the plate heat exchanger through the fluid inlet 5 which is located in the lower portion of the heat transfer plates 1 and 2, then the fluid flows upwards through the passage 4. The fluid is evenly distributed across the width of the heat transfer plates between the lower distribution areas 15A and 15B. In the heat transfer portion 16A and 16B, the fluid initially passes across the zones 17A and 17B, which have corrugation patterns that provide a relatively great flow resistance, i.e., the intervening angle between the intersecting ridges and the direction of fluid flow is comparatively large. Because this type of corrugation pattern provides a relatively large flow resistance, vapour is generated relatively soon in the passages 4. As the fluid and generated vapour continue to flow between the zones 18A and 18B then between the zones 19A and 19B, the angles of the intersecting ridges gradually decrease, i.e., the intervening angle between the ridges and the direction of flow of the fluid gradually becomes more acute. Thus, the flow resistance in the passages 4 for the fluid and generated vapour gradually decreases. The fluid and generated vapour then continue to flow to the upper distribution areas 20A and 20B and further through the outlet 6.

Countercurrent flow occurs in the passages 7 for the heating medium. Steam, which is supplied through the steam inlet 8, is subjected to a gradually increasing flow resistance while flowing down the passages 7. Two condensate outlets 9 are shown in FIG. 1; however, an alternative embodiment of the present invention uses only one of such outlets.

In the embodiment of the invention shown in FIGS. 1-3, both of the heat transfer plates 1 and 2 have several zones with different corrugation patterns. Alternatively, only one of the heat transfer plates of the pair may have several different zones, while the other plate may have only one uniform corrugation angle. In addition, the zones of each plate have been shown as opposing the corresponding zones of the other plate in the pair. In the alternative, the zones could be located so that they only partially overlap with each other. Also, the number and size of the zones could vary.

I claim:
1. A plate heat exchanger for the heat treatment of a fluid comprising:
   a plurality of pairs of heat transfer plates each being so shaped as to ahve a longitudinal axis;
   each pair of plates defining a flow space between them,
   each plate having an angular corrugation pattern of ridges and grooves at an angle to the longitudinal axis of the plate,
   the ridges of each plate in each pair abutting the ridges of the other plate in the pair,
   each flow space having an inlet and an outlet,
   alternate flow spaces forming passages for said fluid and for a heating exchange medium,
   at least one of the plates defining a flow space for said fluid having a plurality of zones having different corrugation patterns, arranged sequentially in the direction of fluid flow, the angles of the ridges and grooves changing progressively in the direction of flow to provide flow resistance which decreases in the direction of fluid flow.

2. The plate heat exchanger according to claim 1, wherein the ridges of each plate of each pair intersect with the ridges of the other plate in the pair.

3. The plate heat exchanger according to claim 1, wherein the ridges of each zone incline at an angle relative to the longitudinal axis of the plate which decreases from one zone to another along the direction of fluid flow.

4. The plate heat exchanger according to claim 1, wherein the ridges and groves of the two plates are oppositely inclined to one another.

5. The plate heat exchanger according to claim 1, wherein said angles of the corrugation pattern change progressively in the dirction of flow through a flow space for said fluid to progressively alter the flow resistance through said flow space.

6. The plate heat exchanger according to claim 1, wherein at least alternate plates have at least two different zones with different corrugation patterns.

7. The plate heat exchanger according to claim 1, wherein each of the plates have at least two different zones with at least two different corrugation patterns.

8. The plate heat exchanger according to claim 7, wherein the ridges of each of the zones of one plate are located in front of the ridges of the corresponding zone of the other plate in the pair.

9. The plate heat exchanger according to claim 1, wherien at least one of the plates defines a flow space for said heating fluid and has a plurality of zones with different corrugation patterns, arranged sequentially in the direction of fluid flow, to provide flow resistance which increases in the direction of heating fluid flow.

10. A plate heat exchanger for the heat treatment of a fluid comprising:
a plurality of pairs of heat transfer plates each being so shaped as to ahve a longitudinal axis;
each pair of plates defining a flow space between them,
each plate having an angular corrugation pattern of ridges and grooves at an angle to the longitudinal axis of the plate,
each flow space having an inlet and an outlet,
alternate flow spaces forming passages for said fluid and for a heating exchange medium,
the ridges and grooves of the two plates in each pair being oppositely inclined to one another, and
said angles changing progrsesively in the direction of flow through a flow space for said fluid to alter the flow resistance progressively through said flow space.

* * * * *

UNITED STATES PATENT AND TRADEMARK OFFICE
CERTIFICATE OF CORRECTION

PATENT NO. : 5,174,370
DATED : December 29, 1992
INVENTOR(S) : Leif Hallgren

It is certified that error appears in the above-indentified patent and that said Letters Patent is hereby corrected as shown below:

```
Col. 1, line 10, after :pair", delete "D"
        line 17, after "each", add --heat transfer plate has a uniform
        corrugation pattern over its--.
Col. 4, line 55, change "ahve" to --have--.
Col. 5, line 18, change "dirction" to --direction--.
Col. 6, line 4, change "wherien" to --wherein--.
        line 13, change "ahve" to --have--.
        line 16, delete entire line and substitute --at least one
        plate of each pair having a plurality of--.
        line 21, change "heating" to --heat--.
        line 24, change "progrsesively" to --progressively--.
```

Signed and Sealed this

Second Day of November, 1993

Attest:

BRUCE LEHMAN

Attesting Officer     Commissioner of Patents and Trademarks